US009743466B2

(12) United States Patent
Tao et al.

(10) Patent No.: US 9,743,466 B2
(45) Date of Patent: Aug. 22, 2017

(54) LED REPLACEMENT LAMP FOR SAFE OPERATION UNDER FAULT CONDITION

(71) Applicant: PHILIPS LIGHTING HOLDING B.V., Eindhoven (NL)

(72) Inventors: Haimin Tao, Eindhoven (NL); Bernhard Christiaan Van Dijk, Geldrop (NL); Borong Su, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/902,750

(22) PCT Filed: Jul. 23, 2014

(86) PCT No.: PCT/EP2014/065772
§ 371 (c)(1),
(2) Date: Jan. 4, 2016

(87) PCT Pub. No.: WO2015/014680
PCT Pub. Date: Feb. 5, 2015

(65) Prior Publication Data
US 2016/0174308 A1 Jun. 16, 2016

(30) Foreign Application Priority Data
Jul. 30, 2013 (EP) .................................... 13178530

(51) Int. Cl.
*H05B 33/08* (2006.01)
(52) U.S. Cl.
CPC ..... *H05B 33/0809* (2013.01); *H05B 33/0884* (2013.01); *Y02B 20/383* (2013.01)

(58) Field of Classification Search
CPC ............ H05B 33/0809; H05B 33/0884; Y02B 20/383
See application file for complete search history.

(56) References Cited

U.S. PATENT DOCUMENTS 5,726,535 A    3/1998   Yan
8,358,056 B2 *   1/2013   Park .................. H05B 33/0803
                                                       313/498

(Continued)

FOREIGN PATENT DOCUMENTS

DE     102010003266 A1    9/2011
EP           2378839 A2    10/2011

(Continued)

*Primary Examiner* — Alexander H Taningco
*Assistant Examiner* — Kurtis R Bahr
(74) *Attorney, Agent, or Firm* — Akarsh P. Belagodu

(57) ABSTRACT

An LED replacement lamp (20) is described. An LED lighting assembly (40) comprising LED lighting elements is electrically connected to filament emulation circuits, connected to electrical contacts at each of two opposite ends (22a, 22b) of an elongated member. The filament emulation circuits (42) each comprise a first resistor circuit (46) and a second resistor circuit (48) connected to first and second electrical contacts (26a, 24a). The first and second resistor circuits (46, 48) are connected to the LED lighting assembly (40) at a common terminal (50). In order to provide an LED replacement lamp for safe operation even in cases of component failure, and if the replacement lamp (20) is used in incorrect wiring configurations, the first and second resistor circuits (46, 48) each comprise a series connection of at least two resistors, in such a way that in case of failure of one of the resistors, the total resistance of the filament emulation circuits (42) remains above a determined resistance value.

6 Claims, 2 Drawing Sheets

(56) References Cited

U.S. PATENT DOCUMENTS

| | | |
|---|---|---|
| 2010/0033095 A1 | 2/2010 | Sadwick |
| 2011/0043127 A1* | 2/2011 | Yamasaki .......... H05B 33/0809 |
| | | 315/291 |
| 2012/0043892 A1 | 2/2012 | Visser et al. |
| 2015/0351171 A1* | 12/2015 | Tao ........................ H05B 37/02 |
| | | 315/185 R |

FOREIGN PATENT DOCUMENTS

| | | |
|---|---|---|
| WO | 2009136322 A1 | 11/2009 |
| WO | 2012110973 A1 | 8/2012 |
| WO | 2013124827 A1 | 8/2013 |
| WO | 2013164739 A1 | 11/2013 |

* cited by examiner

FIG. 3b
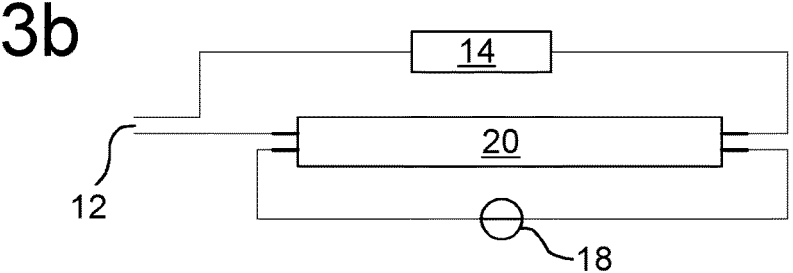
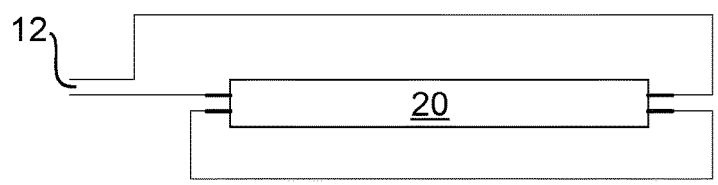
FIG. 3c
FIG. 3d
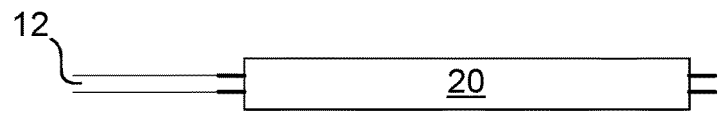
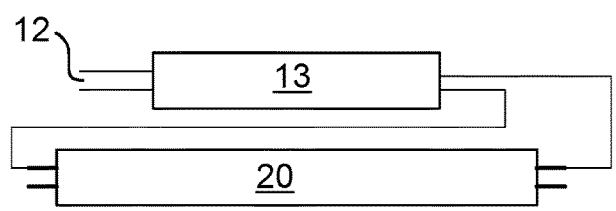
FIG. 3e
FIG. 3f
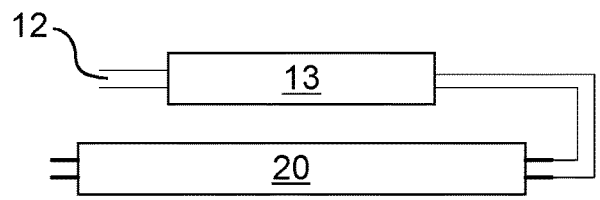

LED REPLACEMENT LAMP FOR SAFE OPERATION UNDER FAULT CONDITION

CROSS-REFERENCE TO PRIOR APPLICATIONS

This application is the U.S. National Phase application under 35 U.S.C. §371 of International Application No. PCT/EP2014/065772, filed on Jul. 23, 2014, which claims the benefit of European Patent Application No. 13178530.5, filed on Jul. 30, 2013. These applications are hereby incorporated by reference herein.

FIELD OF THE INVENTION

The invention relates to an LED replacement lamp, and to a lighting arrangement including an LED replacement lamp.

BACKGROUND OF THE INVENTION

Fluorescent lamps, in particular in the form of fluorescent tube lamps, are today used in many lighting applications. A large number of lighting fixtures for fluorescent tube lamps are installed.

With the availability of highly efficient LED lighting elements, there are already LED replacement lamps available intended to be used as "retrofit" or replacement LED lamps, replacing fluorescent lamps in installed lighting fixtures.

For the operation of fluorescent lamps, electrical configurations are known which comprise a simple electromagnetic (EM) ballast and a glow starter, as well as more advanced configurations including an electronic ballast.

WO 2009/136322 A1 describes a light emitting system with a light emitting diode and a socket adapter for retrofitting a fluorescent lamp. An electrical circuit is adapted for emulating the presence of fluorescent lamps to a fluorescent lamp driver.

SUMMARY OF THE INVENTION

It may be considered an object to provide an LED replacement lamp and lighting arrangement allowing safe operation even in case of fault condition of individual components.

This object is achieved according to the invention by an LED replacement lamp and a lighting arrangement according to the claims.

The lamp according to the invention comprises one or more LED lighting elements arranged on an elongated member with a first end and opposite second end. In the present context, the term "LED" is used broadly, covering all types of solid state lighting elements, including individual components as well as electrical circuits with multiple components, or groups of components, the components including both light emitting diodes (LED) and organic light emitting diodes (OLED).

The elongated member may in particular be of a size corresponding to standardized fluorescent tube lamps, e. g. 205 mm, 325 mm, 355 mm, etc. and may comprise e. g. an at least partially transparent housing, particularly in tube form. At each of the opposite ends, two electrical contacts are provided, preferably in the form of protruding contact pins.

Within the lamp, filament emulation circuits are connected to the electrical contacts at both ends. These filament emulation circuits serve to provide an electrical behavior between the two contacts at both ends which emulates the filament of a fluorescent tube lamp. Consequently, if the LED replacement lamp including these filament emulation circuits is used in a lighting fixture including a ballast, and in particular an electronic ballast, the electrical behavior will be similar to that of heating filaments; in particular, there will be a defined electrical resistance between the contacts.

An LED lighting assembly is electrically connected to the filament emulation circuits to be supplied with electrical power. The LED lighting assembly comprises said one or more LED lighting elements, and preferably additional circuitry such as a driver circuit to convert the supplied electrical power to current and/or voltage values as required by the LED lighting elements.

According to the invention, the filament emulation circuits each comprise a first resistor circuit connected to a first electrical contact and a second resistor circuit connected to a second electrical contact at each end. The first and second resistor circuits are connected to the LED lighting assembly at a common terminal.

According to one aspect of the invention, each of the first and second resistor circuits comprises a series connection of at least two resistors, preferably even more such as at least three, or, particularly preferred, at least four resistors.

A string of resistors as proposed according to the invention has the advantage of increased fault tolerance in case of single component failure. If one of the resistors fails, i. e. is short-circuited, the remaining resistance of the series connection is still sufficient to provide an adequate resistance value between the contacts, or in other words is still above a determined resistance value. Thus, the filament emulation circuits proposed according to the invention are robust against component failure.

The more resistors are arranged in series, the less impact there will be on the overall resistance, in case of a failure of one resistor. For example, an arrangement of eight resistors in series will lead to a reduction of the total resistance of the two resistor circuits by only 12.5% in case one of the resistors fails.

According to a preferred embodiment of the invention, there may be provided in at least one of the filament emulation circuits a current limiting circuit connected in series with at least one of the resistor circuits. The current circuit element is disposed to prevent an overcurrent from flowing. Preferably, the current limiting circuit cuts off current flow in case of an overcurrent. In one possible embodiment, the current limiting circuit may comprise an electrical fuse.

Preferably, the filament emulation circuits have an at least substantially symmetrical circuit design with regard to the contacts. The resistor circuits preferably have the same combined resistance value. The above described current limiting circuit may be provided at only one of the contacts, which is still considered a "substantially symmetrical" circuit design if the resistance value of the (untriggered) current limiting circuit is sufficiently low (e. g. 20% or less, preferably 10% or less of the total resistance of the resistor circuits). Alternatively, to obtain full symmetry, it is possible to arrange one current limiting circuit at each of the contacts.

According to a further preferred aspect, a current limiting circuit provided in series with at least one of the resistor circuits is a resettable circuit and/or comprises a resettable element. In case of a resettable circuit and/or element, this is achieved without permanent damage, as in the case of an electrical fuse. After a reset (e. g. after turning off the power), the regular function of the resettable circuit or element is restored. Particularly preferred is the use of a PTC (positive temperature coefficient) resistor element within the current limiting circuit, which may be reset by cutting off the power to allow cooling of a PTC element.

According to a further preferred embodiment of the invention, at least one of the emulation circuits further comprises a voltage limiting circuit connected in parallel to the resistor circuits. A voltage limiting circuit may serve to prevent damage caused by excessive voltage applied between the electrical contacts at one end. Preferably, the voltage limiting circuit may comprise a voltage limiting element, such as a VDR, DIAC, SIDIAC, spark gap, gas discharge tube, or bidirectional thyristor over voltage protector. This allows protecting the lamp circuitry from damage in case mains voltage is directly applied between two contact pins at the same end. In particular, the resistors of the filament emulation circuits are protected, because the voltage limiting circuit breaks down and shunts the current from the filament resistors. In particular, if additionally the above described current limiting circuit is provided, the filament emulation resistors are protected from failure.

It should be appreciated that all combinations of the foregoing concepts, and the additional concepts discussed in greater detail below, are contemplated as being part of the inventive subject matter disclosed herein.

These and other aspects of the invention will be apparent from and elucidated with reference to the embodiments described hereinafter.

BRIEF DESCRIPTION OF THE DRAWINGS

In the drawings:

FIG. 3*a*-3*f* show examples of lighting arrangements with different wiring of an LED replacement lamp.

DETAILED DESCRIPTION OF THE DRAWINGS

The present invention aims at providing an LED replacement lamp 20 for operation in a lighting arrangement (lighting fixture) intended for a fluorescent tube lamp.

Figure 3A:
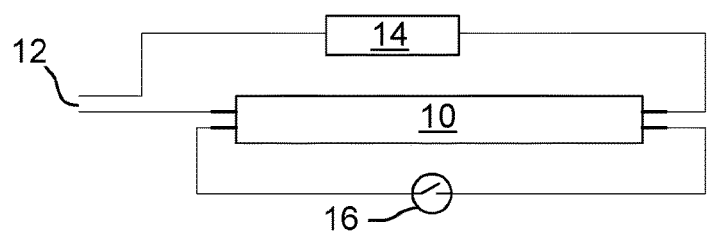

Currently, a large number of lighting fixtures for fluorescent tube lamps are installed. FIG. 3*a* shows the wiring of a lamp 10, in this case a fluorescent tube lamp 10, with two electrical contacts at both ends. Electrical mains voltage is supplied at a terminal 12, at which one contact at a first end of the lamp 10 is directly connected, and an input of a ballast 14 is also connected to mains. An output of the ballast 14 is connected to one electrical contact at the other, second end of the lamp 10. Further, the remaining contacts at each end of the lamp 10 are interconnected over a glow starter or electronic starter 16. As known to the skilled person, a fluorescent lamp operated at an electromagnetic ballast as shown is turned on after an initial heating current through the filaments is supplied.

FIG. 3*b* shows the wiring for an LED replacement lamp 20, inserted within a lamp fixture instead of a fluorescent tube lamp. The starter is replaced by a dummy starter 18. Besides this replacement, no rewiring or modification of the luminaire and ballast are required.

Figure 1:
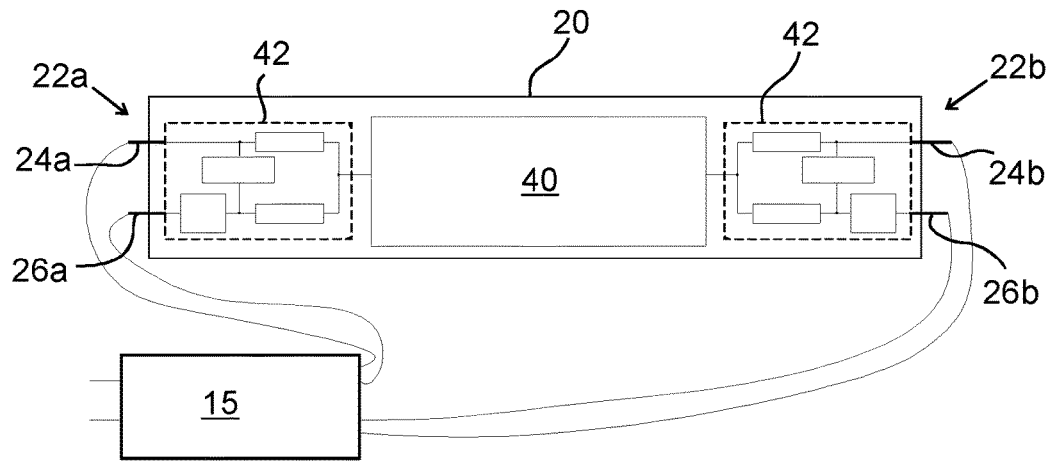
FIG. 1 shows a symbolic circuit diagram of an embodiment of a lighting arrangement including an LED replacement lamp with filament emulation circuits.

FIG. 1 shows a symbolic circuit diagram of the LED replacement lamp 20, in this case connected to an electronic ballast 15. The lamp 20 is of elongate shape with a first end 22*a* and opposed second end 22*b*. At each end 22*a*, 22*b*, two electrical contact pins 24*a*, 26*a*; 24*b*, 26*b* protrude.

The LED replacement lamp 20 comprises an LED lighting assembly 40, which is not shown in detail. The LED lighting assembly 40 comprises an LED driver circuit (not shown) connected to a plurality of LED lighting elements 28 distributed over the length of the LED replacement lamp 20.

The LED lighting assembly 40 is electrically connected to filament emulation circuits 42 electrically connected to the electrical contacts 24*a*, 26*a*; 24*b*, 26*b* at both ends 22*a*, 22*b*. In operation of the lamp 20 at the electronic ballast 15, electrical power supplied to the contacts 24*a*, 26*a*; 24*b*, 26*b* is supplied to the LED lighting assembly 40 such that the LED lighting elements may be operated. The electronic ballast 15 supplies a heating current and ignition voltage to start the lamp 20. For this heating current, the filament emulation circuits 42 provide a defined electrical resistance between the contact pins 24*a*, 26*a*; 24*b*, 26*b* at both ends 22*a*, 22*b*.

Figure 2:
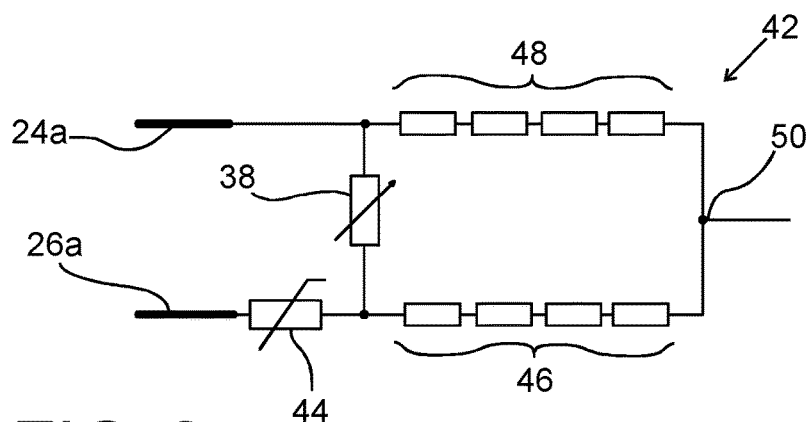
FIG. 2 shows a circuit diagram of an embodiment of a filament emulation circuit.

FIG. 2 shows in greater detail the components of the filament emulation circuit 42 provided at both ends 22*a*, 22*b* of the LED replacement lamp 20. Connected in series to one of the contact pins 26*a* is a PTC element 44 provided as a resettable fuse for overcurrent protection.

Connected in series with the PTC element 44 is a first resistor circuit 46 comprised of a series connection of four resistors. The resistors are of equal resistance rating; in a preferred embodiment, the resistors are each SMD components with an electrical resistance of 1Ω.

Connected to the other contact pin 24*a* is a second resistor circuit 48 equally comprised of a series connection of four identical resistors (SMD, 1Ω).

The resistor circuits 46, 48 are interconnected at a common terminal 50, where the LED lighting assembly 40 (see FIG. 1) is connected.

Further connected in parallel to the resistor circuits 46, 48 is a VDR 38 (voltage dependent resistor). The VDR 38, also referred to as varistor, is used as voltage limiting circuit protecting the resistor circuits 46, 48 from overvoltage. If excessive voltage is applied, the VDR 38 breaks down and the current through the VDR 38 will increase significantly, such that the current voltage across the resistors is limited and created by the high voltage is shunted away from the resistor circuits 46, 48.

The LED replacement lamp 20 equipped with the described filament emulation circuits 42 fulfills a number of important operational and safety functions. In operation connected to an electronic (HF) ballast 15, the resistor circuits 46, 48 emulate a filament resistance of 8Ω, providing a resistive impedance at the contact pins 24*a*, 26*a*; 24*b*, 26*b*. The design of the lamp 20 is symmetrical using identical filament emulation circuits 42 at both ends 22*a*, 22*b*. Likewise, since in normal operation the PTC element 44 (resettable fuse) will conduct a current with low resistance and may thus be modeled as a through connection, and the VDR 38 may, at the low voltages applied during normal operation, be substantially regarded as an open loop, the design of the filament emulation circuits 42 with regard to the input pins 24*a*, 26*a* are also symmetrical. Due to this symmetry, regardless of the wiring order and arrangement of the LED lamp 20 within a fixture, the lamp 20 will always be in the same electrical configuration.

Some PTCs have substantial ohmic resistance (e. g., several ohms). In this case a second PTC may be added in series with the second resistor circuit 48 (i. e. connected between the contact pin 24*a* and the common node of the VDR 38 and the second resistor circuit 48) to keep the symmetry. Because of the resistance of the PTCs 44, some of the SMD resistors in the first and second resistor circuits 46, 48 may be omitted as long as the total resistance (the series connection of PTCs and resistor circuits 46, 48) is above 8Ω.

In case of a fault of any individual component (open loop failure or short connection failure), safety is still ensured. Even a short circuit occurring at any of the resistors of the resistor circuits 46, 48 will still lead to sufficiently high remaining electrical resistance due to the series connection of a plurality of resistors.

Further, the design is safe even in misuse cases, e. g. rewired fixtures. FIGS. 3c-3f show examples of such wiring configurations. In FIG. 3c, the lamp 20 is directly connected to mains without a ballast. In FIG. 3d, the contact pins at one end are directly connected to mains, leading to a high voltage which will be shunted by the VDR 38, so that the increased current will eventually trigger the PTC 44, while the resistor circuits 46, 48 are protected. After resetting and cooling of the PTC element 44, the lamp 20 may even be re-used in a correct wiring configuration.

Also, in the wiring configurations of FIG. 3e (external LED driver 13 with only one contact pin connected at each end of the lamp 20), or according to FIG. 3f (external LED driver 13 directly connected to both contact pins at one end of the lamp 20), the filament circuits 42 still provide the required safety.

Further, the design is safe when misused in a wiring configuration with an electromagnetic (EM) ballast. FIGS. 3a and 3b show such examples. In FIG. 3a the lamp is connected to an EM ballast 14 via a glow starter 16. In FIG. 3b the lamp 20 is connected to an EM ballast 14 via a dummy starter 18. The lamp 20 according to the above described embodiment in both of these misuse cases will not operate. The EM ballast 14 is shorted via the filament circuit 42 and the starter, resulting in an increased current through the filament emulation circuits 42. The current limiting device (PTC 44) prevents an increased current from overheating the resistor circuits 46, 48 by tripping and interrupting the current in this case.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims the word "comprising" does not exclude other elements or steps, and the undefined article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. LED replacement lamp, comprising:
one or more LED lighting elements arranged on an elongated member with opposite ends, wherein at each of said opposite ends two electrical contacts are provided,
wherein filament emulation circuits are connected to said electrical contacts at said both ends,
and wherein an LED lighting assembly comprising said one or more LED lighting elements is electrically connected to said filament emulation circuits to be supplied with electrical power for operation of said LED lighting elements,
wherein said filament emulation circuits each comprise a first resistor circuit connected to a first of said electrical contacts, and a second resistor circuit connected to a second of said electrical contacts, and said filament emulation circuit comprises a voltage limiting circuit connected in parallel to said resistor circuits,
and where said first and second resistor circuits are connected to said LED lighting assembly at a common terminal,
and where each of said first and second resistor circuits comprises a series connection of at least four resistors, in such a way that in case of failure of one of the resistors, the total resistance of the filament emulation circuits remains above a determined resistance value.

2. LED replacement lamp according to claim 1, wherein said filament emulation circuits each comprise a current limiting circuit connected in series with at least one of said resistor circuits.

3. LED replacement lamp according to claim 2, wherein said current limiting circuit comprises a resettable current limiting element.

4. LED replacement lamp according to claim 3, wherein said resettable current limiting element is a PTC element.

5. LED replacement lamp, comprising:
one or more LED lighting elements arranged on an elongated member with opposite ends, wherein at each of said opposite ends two electrical contacts are provided,
wherein filament emulation circuits are connected to said electrical contacts at said both ends,
and wherein an LED lighting assembly comprising said one or more LED lighting elements is electrically connected to said filament emulation circuits to be supplied with electrical power for operation of said LED lighting elements,
wherein said filament emulation circuits each comprise a first resistor circuit connected to a first of said electrical contacts, and a second resistor circuit connected to a second of said electrical contacts, and said filament emulation circuit comprises a voltage limiting circuit connected in parallel to said resistor circuits,
and where said first and second resistor circuits are connected to said LED lighting assembly at a common terminal,
and where each of said first and second resistor circuits comprises a series connection of at least four resistors, in such a way that in case of failure of one of the resistors, the total resistance of the filament emulation circuits remains above a determined resistance value wherein
said voltage limiting circuit comprises at least one element chosen out of the group comprising a VDR, DIAC, SIDIAC, spark gap, gas discharge tube, bidirectional tyristor overvoltage protector, and said voltage limiting circuit is between said electrical contacts and said first resistor circuit and said second resistor circuit.

6. Lighting arrangement comprising
an LED replacement lamp according to one of the above claims, connected to a ballast of a fluorescent lamp fixture.

* * * * *